United States Patent [19]

Murakami

[11] 3,822,772

[45] July 9, 1974

[54] CLUTCH DISC RELEASING SPRING WITH AUTOMATIC WEAR COMPENSATOR

[75] Inventor: Kiyoharu Murakami, Osaka, Japan

[73] Assignee: Kabushiki Kaisha Daikin Seisakusho, Prefecture, Japan

[22] Filed: Feb. 27, 1973

[21] Appl. No.: 336,367

[30] Foreign Application Priority Data
Mar. 10, 1972  Japan................................ 47-25015

[52] U.S. Cl............................ 192/111 A, 192/70.28
[51] Int. Cl............................................. F16d 13/75
[58] Field of Search...................... 192/70.28, 111 A

[56] References Cited
UNITED STATES PATENTS
2,965,207  12/1960  Snyder............................ 192/111 A
3,221,854  12/1965  Jaeschke et al............. 192/111 A X
3,702,651  11/1972  Fujita et al...................... 192/111 A

*Primary Examiner*—Benjamin W. Wyche
*Attorney, Agent, or Firm*—Depaoli & O'Brien

[57] ABSTRACT

An apparatus comprises a holder fixedly mounted on a main drive shaft, a spring member retained in the holder to move a clutch disc to its neutral position when the clutch is disengaged, an adjusting member supported by the holder and governed by the holder with respect to the amount of its axial movement, and a dished spring member interposed between a free end of the spring member and an end face of spline hub of the clutch disc and having an outer conical slanting face in engagement with the free end of the spring member and an inner conical slanting face in engagement with the end face of the spline hub. A plurality of hornlike extensions extending from the slanting portion of the dished spring member have distal ends in elastic engagement with the inner face of the adjusting member. Upon a clutch disengaging operation, the dished spring member forcibly brings the clutch disc to its neutral position. The space between the friction surface of a flywheel and the friction facing of the clutch disc in its neutral position is always kept constant by automatic adjustment.

4 Claims, 6 Drawing Figures

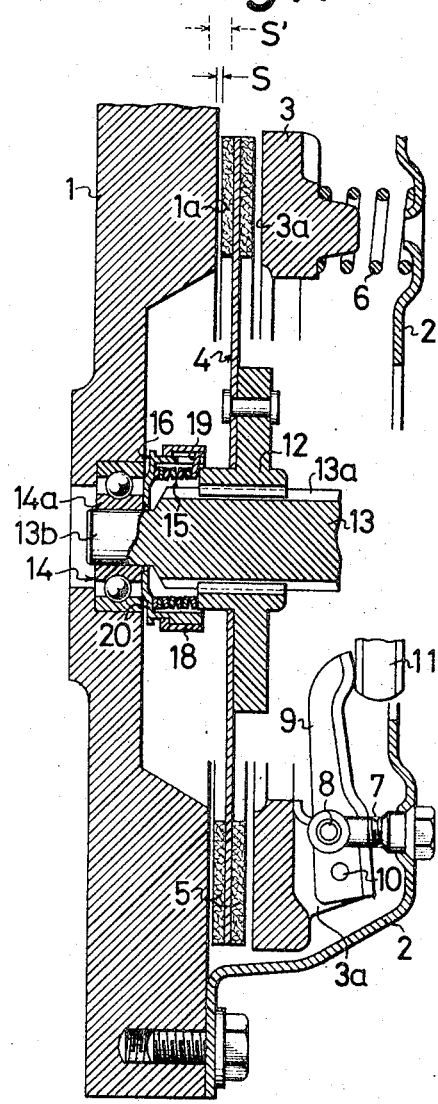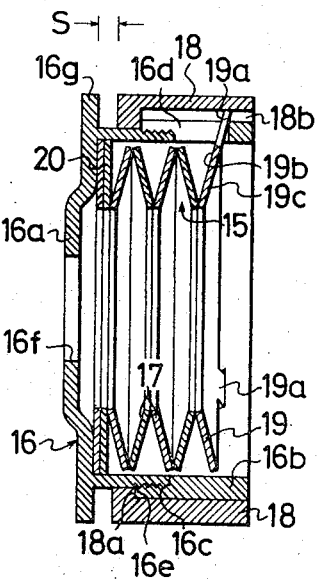

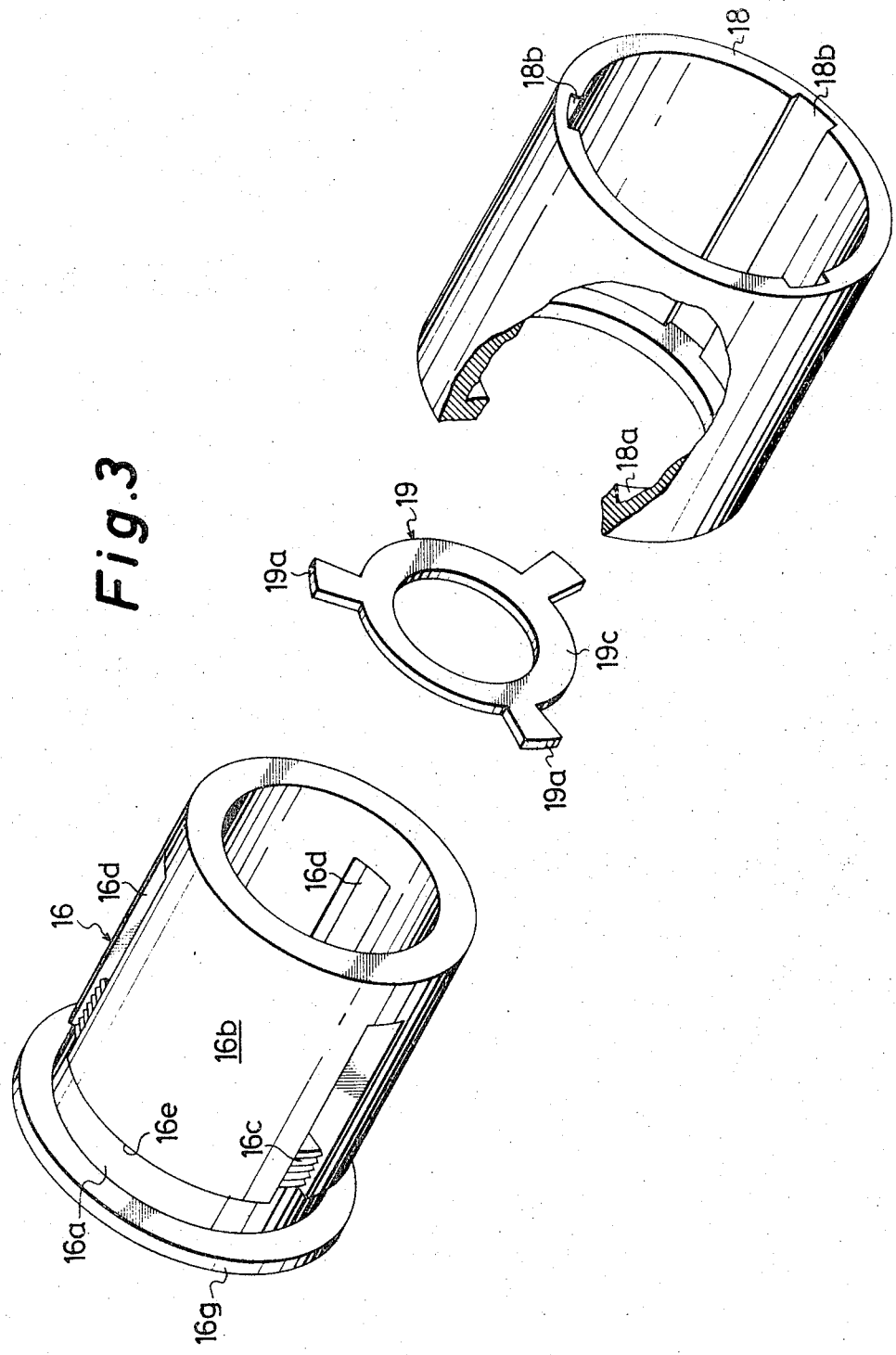

CLUTCH DISC RELEASING SPRING WITH AUTOMATIC WEAR COMPENSATOR

BACKGROUND OF THE INVENTION

This invention relates to an apparatus for preventing improper disengagement of a friction clutch by which when the clutch is disengaged a clutch disc is forcibly moved to its neutral position to separate friction facing on the clutch disc from the friction surfaces of both flywheel and pressure plate.

The clutch disc serving as a torque transmitting member in friction clutches is mounted on a main drive shaft by fitting means such as spline means so as to be movable only in the axial direction for the engagement and disengagement of the clutch. Thus with this type of friction clutches, the clutch disc must be movable smoothly on its support every time the clutch is engaged or disengaged.

However, the splined portion is subject directly of indirectly to resonance resulting from high speed rotation of the main drive shaft or vibration due to high speed driving operation of motor vehicle and is therefore susceptible to oxidation and abrasion, or foreign matters will get in the splined portion to impede the axial movement of the clutch disc.

Further frequent engagement and disengagement of the clutch produces a sticking force between the friction facings and the friction surfaces of flywheel and pressure plate due to slip and heat generation, consequently preventing the axial movement of the clutch disc.

If the clutch disc is prevented from moving to its neutral position when the clutch is disengaged, the surface of the friction facing will still remain in contact with the friction surface of the flywheel, with the result that torque is delivered to the main drive shaft to exert a serious adverse effect on speed changing operation.

To eliminate such objection, it has already been proposed to incorporate a spring in the clutch assembly which spring acts on the clutch disc to move the disc in the direction to disengage the clutch. However, if the spring is too strong, the clutch disc will be brought closer toward the pressure plate beyond its neutral position when the clutch is disengaged, permitting the friction facing to contact the friction surface of the plate to result in improper disengagement of the clutch.

Furthermore, it is noted that due to a long period of use the friction surface of the flywheel and the friction facings wear away progressively, consequently increasing the space between the friction surfaces when the clutch disc is in its neutral position while the clutch is disengaged. This increases the stroke of the clutch disc when it is moved for the engagement of the clutch and gives rise to objectionable results such as delayed engagement.

SUMMARY OF THE INVENTION

An object of this invention is to provide an apparatus for forcibly moving the clutch disc to its neutral position when the clutch is disengaged.

Another object of this invention is to provide an apparatus for automatically adjusting the space to be formed between the friction surface of flywheel and the friction facing on the clutch disc when the clutch disc is moved to its neutral position.

According to this invention, a main drive shaft supporting thereon a clutch disc movably only in the axial direction for rotation therewith fixedly carries a cuplike holder free from interference with the axial movement of the clutch disc, and the holder supports an adjusting member whose axial movement is restrained.

The holder houses spring means having one end bearing against the inner bottom face of the holder. Disposed in the adjusting member is a dished spring member having a plurality of hornlike extensions extending from its outer periphery and in engagement with the inner face of the adjusting member.

The dished spring member has an outer conical slanting face bearing against a free end of the spring means and an inner slanting face in engagement with an end face of spline hub of the clutch disc to deliver the elastic force of the spring means to the spline hub. Thus, due to the diametrical expanding force of the dished spring member and the elastic force of the spring means, the dished spring member has its hornlike extensions wedged in the inner face of the adjusting member which is prevented from axial movement by the holder when the clutch is in its disengaged state. Since the holder restrains further movement of the adjusting member, the clutch disc in the neutral position is rendered free from the elastic force of the spring means and is thereby prevented from moving further away from the flywheel.

During a clutch engaging operation, a pressure plate pushing the clutch disc toward the flywheel exerts pressure on the spring means through the clutch disc, spline hub and the dished spring member to compress the spring means.

The adjusting member in engagement with the hornlike extensions of the dished spring is moved on the holder in the axial direction by the dished spring member which is pushed under the pressure of the pressure plate. The adjusting member stops at a position defined by the holder. Normally, the clutch engaging operation is completed in this state. However, if the clutch has not been completely engaged due to the wear of friction facing or flywheel, the spring means and dished spring member will be further compressed under the pressure of the pressure plate, with the result that the hornlike extensions of the dished spring member is forced out of wedging engagement with the inner face of the adjusting member and is slid thereon inwardly of the adjusting member and the holder. Upon completion of the engagement of the clutch, the hornlike extensions rigidly engage in the inner face of the adjusting member.

In this way, the movement of the adjusting member for the disengagement of the clutch is limited to a constant amount all the time, whereby the expansion of the spring means is also limited.

Accordingly, if the amount of movement of the adjusting member is made equal to the predetermined space between the flywheel friction surface and the friction facing of the clutch disc in the neutral position, the pressure exerted on the spline hub by the spring means will be nullified the moment when the clutch disc reaches its neutral position, this consequently preventing the clutch disc from moving further away from the flywheel. The position of engagement of the hornlike extensions of the dished spring member with the adjusting member is adjusted every time the clutch is engaged, eliminating an excess increase in the space between the flywheel and the clutch disc in the neutral position.

Other objects and features of this invention will become more apparent from the following description.

BRIEF DESCRIPTION OF THE DRAWINGS

FIG. 1 is a view in vertical section showing the construction of principal part of a clutch embodying this invention, the clutch being shown in its disengaged state;

FIG. 2 is an enlarged view in vertical section showing the main elements illustrated in FIG. 1;

FIG. 3 is an exploded perspective view showing the main elements in FIG. 2;

DESCRIPTION OF THE PREFERRED EMBODIMENTS

Figure 4:
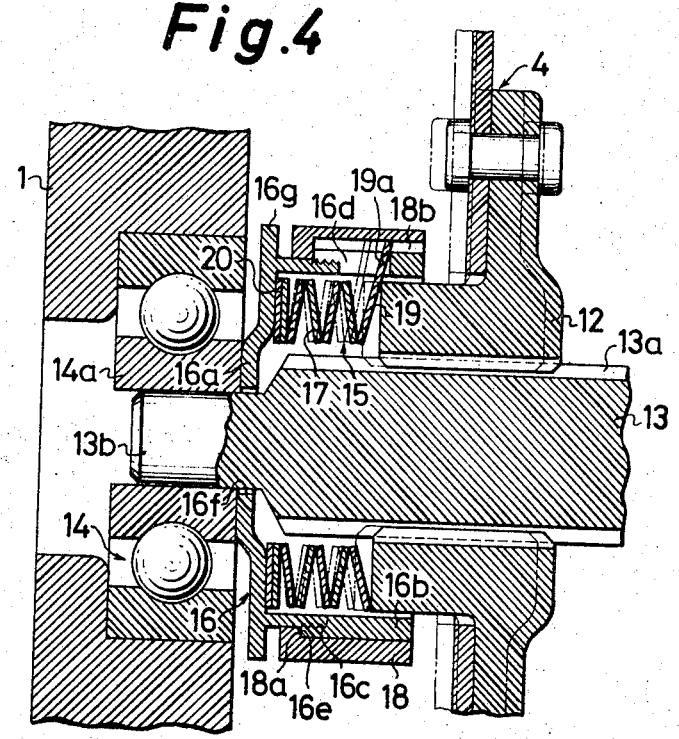
FIGS. 4 and 5 are views illustrating the operation of the clutch.

With reference to FIG. 1, a flywheel 1 is fixedly mounted on an unillustrated drive shaft of a prime mover. A clutch cover 2 supports a pressure plate 3 in such manner that the plate 3 is movable only in the axial direction. Interposed between the flywheel 1 and the pressure plate 3 are friction facings 5 fixed to a clutch disc 4 on its opposing side faces at the outer periphery.

The pressure plate 3 is biased by coiled springs 6 bearing against the clutch cover 2 to clamp the friction facings 5 between the flywheel 1 and the pressure plate 3 while the clutch is in its engaged state. Although only one coiled spring 6 is illustrated, a plurality of springs 6 are arranged circumferentially at an equal spacing as already well known so as to render the pressure plate movable in parallel fashion.

The pressure plate 3 is formed on its side face with projections 3a each pivoted as at 10 to the acting end of each of release levers 9 which is fulcrumed as at 8 on the clutch cover 2 by means of a support bolt. When the driven end of the release lever 9 is pushed leftward by a release bearing 11, the pressure plate 3 moves righward to disengage the clutch. If the bearing 11 is retracted rightward, the springs 6 push the pressure plate 3, causing the clutch facings 5 to be clamped by the flywheel 1 and the pressure plate 3 to engage the clutch. Although only one release lever 9 is shown, a plurality of levers 9 are of course disposed circumferentially at an equal spacing as well known. Further a known diaphragm spring may substitute for the pressure plate operating mechanism comprising the coiled springs 6 and the release levers 9, FIG. 1 shows the clutch in its disengaged state.

The clutch disc 4 has at its center a spline hub 12 splined to a spline portion 13a of a main drive shaft 13 so as to be movable only in the axial direction. The main drive shaft 13 has its end 13b rotatably supported on the flywheel 1 by means of a pilot bearing 14. Thus the inner ring 14a of the pilot bearing 14 fixedly fits around the shaft end 13b.

According to this invention, the clutch assembly described includes a spring member 15 acting on the spline hub 12 to bias the clutch disc 4 in the direction to disengage the clutch. The spring member 15 comprises a plurality of dished springs 17 disposed in a holder 16 in the form of a cuplike cylinder, with their conical faces oriented in opposite directions alternately. The left end of the spring member 15 bears against a plurality of shims 20 placed on the inner bottom face of the holder 16. The number of the shims 20 may vary to control the elastic force of the spring member 15. Alternatively, the spring member 15 may comprise a single coiled spring, instead of the assembly of the dished springs 17.

As shown in greater detail in FIGS. 2 to 5, the holder 16 comprises a dishlike portion 16a and a cylindrical portion 16b joined together by screw-thread engagement as at 16c. The cylindrical portion 16b is formed with a plurality of slits 16d equidistantly spaced apart circumferentially thereof and extending in parallel to its axis and has a stepped portion 16e. The dishlike portion 16a has at the center of its bottom a hole 16f for passing the end 13b of the main drive shaft 13 and bulges outward around the hole 16f to bear against the end face of the inner ring 14a of the pilot bearing 14. The dishlike portion further has a flange 16g at its outer periphery. The inner ring 14a of the pilot bearing serves also as a support for fixedly supporting the holder 16 on the main drive shaft 13.

A cylindrical adjusting member 18 is fitted around the holder 16 in axially movable manner and is formed along the inner periphery of its one end with a flange 18a which is positioned between the flange 16g and the stepped portion 16e of the holder 16 to determine the amount S of axial movement of the adjusting member 18. As will be described later, the amount S of movement thus determined is equal to a space S to be formed between the friction facing 5 and the friction surface 1a of the flywheel when the clutch disc 4 is brought to its neutral position.

Formed in the inner face of the adjusting member 18 are a plurality of key groove-like longitudinal grooves 18b positioned outside the slits 16d of the holder 16.

At the right end of the spring member 15, namely at its free end opposing the spline hub 12, there is disposed a dished spring member 19 having an outer conical slanting face 19b bearing against the free end of the spring member 15 and an inner slanting face 19c in engagement with the end face of the spline hub 12 to deliver the elastic force of the spring member 15 to the spline hub 12. The dished spring member 19 has hornlike extensions 19a identical in number to the slits 16d of the holder 16 and in alignment with the conical face of the member 19. The distal ends of the hornlike extensions 19a project outward from the holder 16 through the slits 16d and elastically contact the bottom faces of the longitudinal grooves 18b in the adjusting member 18. Thus the elastic expansion of the dished spring member 19 per se and the elastically of the spring member 15 force the distal ends of the extensions 19a into engagement with the bottom faces of the grooves 18b. Alternatively, the adjusting member 18 may not be formed with the longitudinal grooves 18b to permit the distal ends of the hornlike extension 19a to engage directly in the inner face of the adjusting member 18, but the longitudinal grooves 18b serve to guide the adjusting member 18 for the axial movement without permitting the rotation of the same.

When the release bearing 11 is moved rightward by a clutch engaging action, the coiled springs 6 acts to force the pressure plate 3 leftward, pushing the friction facings 5 to move the clutch disc 4 from the solid line position to the borken line position in FIG. 4. As a result, the friction facings 5 are pressed against the friction surface 1a of the flywheel to completely engage the clutch.

Due to the foregoing operation, the spline hub 12 connected to the clutch disc 4 moves leftward, compressing the spring member 15 through the dished spring member 19 to accumulate its elastic force.

The dished spring member 19 with its hornlike extensions 19a in engagement with the adjusting member 18 moves leftward along with the member 18 when pushed by the spline hub 12 as described above. Consequently, the member 18 comes to a halt with its left end face brought into contact with the flange 16g of the holder 16 when the clutch is completely engaged.

When the release bearing 11 is moved leftward to disengage the clutch, the pressure plate 3 moves rightward while compressing the coiled springs 6. At the same time, the elastic force of the spring member 15 pushes the spline hub 12 righward, forcibly bringing the clutch disc 4 toward its neutral position.

When moving rightward, the dished spring member 19 forces the adjusting member 18 rightward by virtue of the engagement of the hornlike extensions 19a with the member 18. Upon the clutch disc 4 reaching its neutral position, the inner face of the flange 18a comes into engagement with the stepped portion 16e of the holder 16, this preventing further rightward movement of the member 18, whereby the dished spring member is also prevented from its rightward movement.

Thus, when the clutch disc 4 reaches its neutral position, the spring member 15 acting on the end face of the spline hub 12 is simultaneously prevented from further expansion. The active force of the spring member 15 is therefore nullified at this position. This consequently eliminates the possible contact of the friction facing 5 with the friction surface 3b of the pressure plate 3 due to further rightward movement of the clutch disc 4.

In this way, the adjusting member 18 determines the neutral stop position of the clutch disc 4 during the clutch disengaging operation. The space S between the friction facing 5 of the friction surface 1a of the flywheel 1 is equal to the amount S of movement of the adjusting member 18.

The friction facings 5 of the friction surface 1a of the flywheel will be worn away progressively by frequent clutch engaging and disengaging operations. Further where desired, the friction surface 1a of the flywheel when impaired must be machined for correction. As a result, the predetermined original space S will increase as indicated at S' in FIG. 1, consequently increasing the stroke of the clutch disc 4 for the engagement of the clutch to deteriorate the performance of the clutch. For instance, delayed engagement of the clutch will result.

The assembly comprising the holder 16, spring member 15, adjusting member 18 and dished spring member 19 automatically adjusts the space S during the engagement of the clutch.

Suppose the space S has increased to S' as seen in FIG. 1. If the clutch is operated for engagement in this state, the pressure plate 3 moves the clutch disc 4 leftward. At this same time, the spline hub 12 compresses the dished spring member 19 and spring member 15 to accumulate their elastic force. The adjusting member 18 moves leftward along with the dished spring 19.

Figure 5:
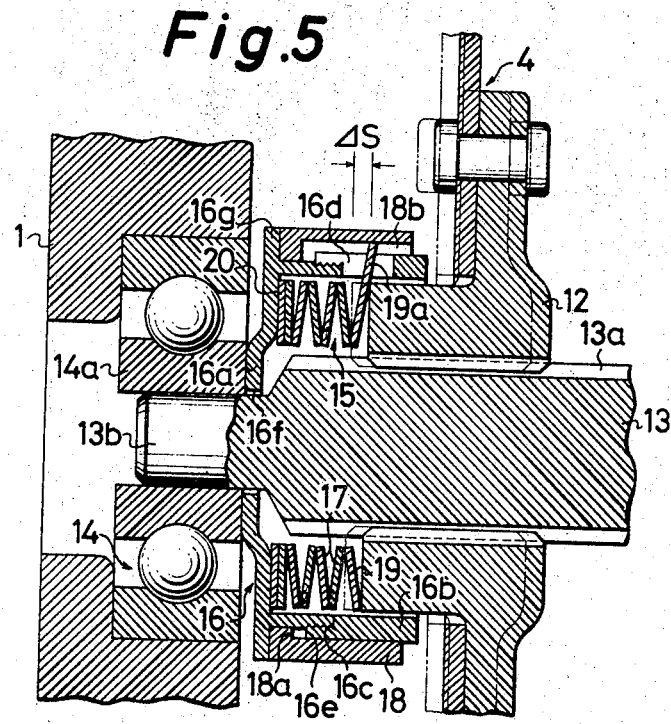

Since the amount S of movement of the adjusting member 18 is limited by the holder 16, the left end face of the adjusting member 18 strikes the flange 16g of the holder 16 as indicated in the solid line in FIG. 5 before the friction facing 5 comes into contact with the friction surface 1a of the flywheel. The member 18 is prevented from further leftward movement.

However, between the friction surface 1a of the flywheel and the friction facing 5 there still remains a space ΔS, namely the space S' resulting from abrasion minus the space S provided originally. Accordingly, the clutch is still out of engagement. The clutch disc 4 will therefore be pushed further leftward, acting to move the dished spring member 19 further leftward. It is noted that the dished spring member 19 has its hornlike extensions 19a wedged in the bottom face of the grooves 18b in the adjusting member 18, with its conical outer slanting face 19b facing the spring member 15, the hornlike extensions 19a extending in slanting fashion from the conical face continuous therewith, so that even if the adjusting member 18 is prevented from the leftward movement, the hornlike extensions 19a will be pushed by the clutch disc 4 along the grooves 18b further leftward beyond the wedged position.

Accordingly, even if the leftward movement of the adjusting member 18 is prevented, the pressure acting on the pressure plate 3 moves the dished spring member 19 further leftward when a space ΔS still remains between the friction facing 5 and the friction surface of the flywheel. Thus the dished spring is moved leftward by the amount ΔS as indicated in the broken line in FIG. 5 to compress the spring member 15, with the result that the repellency of the spring member 15 and the elastic expansion of the dished member 19 per se combined cause the distal ends of the hornlike extensions 19a to wedge in the grooves 18a at a new position. Upon the reduction of the remaining space ΔS to zero, the friction facings 5 are pressed against the friction surface 1a of the flywheel to completely engage the clutch.

When the release bearing 11 is moved leftward by a clutch disengaging operation, the pressure plate 3 moves rightward as already described, permitting the spring member 15 to push the clutch disc 4 to its neutral position. At this same time, the adjusting member 18 also moves rightward. When the member 18 has moved by the specified amount S, the inner flange 18a strikes the stepped portion 16e and the member 18 is prevented from further rightward movement. Since the rightward movement of the dished spring member 19 is also impeded, the clutch disc 4 is prevented from further rightward movement to provide a space between the friction surface 1a of the flywheel and the friction facing 5 which space is precisely equal to the original space S. To sum up, the space between the friction facing 5 and the friction surface 1a will be automatically adjusted by a clutch engaging operation even in the presence of wear. The space when the clutch is in its disengaged state is therefore kept constant all the time.

Every time the space S is automatically adjusted, the amount of compression of the spring member 15 will increase, resulting in an increase in its elastic repellent force. However, the stroke of expansion of the spring member 15 between the clutch engaged position and its disengaged position is always equal to the predetermined space S, so that the spring member 15 will not act on the clutch disc 4 in its neutral position. This eliminates an excess increase in the amount of movement of the clutch disc 4 to assure satisfactory disengagement of the clutch. If the amount of compression of the spring member 15 increases to excess or the friction surface 1a of the flywheel is cut away a great deal for correction, the number of the shims 20 will be reduced or the number of the dished springs 17 constituting the spring member 15 will be reduced. Preferably, the cylindrical portion 16b of the holder 16 may slidably fit around the boss portion of the spline hub 12.

Figure 6:
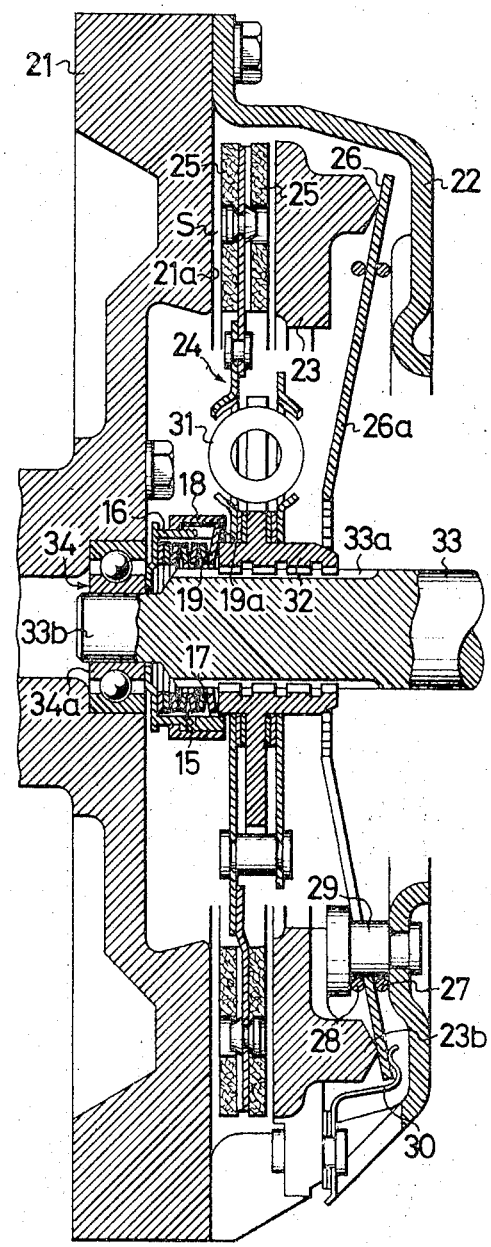
FIG. 6 is a view in vertical section showing the construction of principal part of another embodiment according to this invention, the clutch being shown in its disengaged state.

FIG. 6 shows the construction of principal part of a diaphragm spring clutch embodying this invention. A flywheel 21 is connected to an unillustrated prime mover for rotation. A pressure plate 23 is supported by a clutch cover 22 so as to be movable only in the axial direction. Disposed between the flywheel 21 and the pressure plate 23 are friction facings 25 fixed to the opposite side faces of a clutch disc 24 at its outer periphery. The restoring force of the diaphragm spring 26 urges the pressure plate 23 leftward in the drawing to cause the friction facings 25 to be clamped between the flywheel 21 and the pressure plate 23 for the transmission of torque.

The diaphragm spring 26, fulcrumed by wire rings 27 and 28, is supported on the clutch cover 22 by means of connecting members 29. Clips 30 cause the spring 26 to bear, at several portions along its outer periphery, against several projections 23b on the pressure plate 23. A clutch disengaging operation causes an unillustrated clutch release bearing to push an inner peripheral finger portion 26a leftward to move the pressure plate 23 rightward from its engaged portion to the illustrated position and to thereby remove the clamping pressure for the disengagement of the clutch. When the clutch release bearing is moved rightward by a clutch engaging action, the elastic restoring force of the spring causes the pressure plate to move leftward from the illustrated position, whereby the friction facings 25 are clamped between the flywheel 21 and the pressure plate 23 for the engagement of the clutch.

The clutch disc 24 in the illustrated embodiment includes means such as torsion springs 31 for attenuating vibration in the direction of rotation. The disc 24 has a spline hub 32 splined to a spline portion 33a of a main drive shaft 33 so as to be movable only in the axial direction.

The main drive shaft 33 has its end portion 33b fitted in the inner ring 34a of a pilot bearing 34 supported on a flywheel 21 for rotation with the inner ring 34a.

In the same manner as in the foregoing embodiment of FIG. 1, a holder 16 retained by the inner ring 34a on the main drive shaft 33 houses a spring member 15 which acts through a dished spring member 19 on the spline hub 32 of the clutch disc 24 toward its neutral position. An adjusting member 18 is slidably fitted around the holder 16 to limit the amount of axial movement of the adjusting member 18 in the same manner as in FIG. 1. A dished spring member 19 has it hornlike extensions 19a engaged with the inner face of the adjusting member 18 as in the case of FIG. 1.

Exactly in the same manner as in FIG. 1, the embodiment of FIG. 6 is such that the clutch engaging action makes automatic adjustment to provide a constant space between the friction surface 21a of the flywheel and the friction facing 5 all the time when the clutch is in its disengaged position and to thereby eliminated causes leading to improper disengagement of the clutch.

Although the adjusting member 18 is supported on the holder 16 externally thereof in each of the foregoing embodiments, it is possible to provide the adjusting member 18 within the holder 16, permitting the holder 16 to determine the amount of axial movement. Such modification is included within the scope of this invention insofar as it does not alter the principal teaching of this invention.

What is claimed is:

1. In a friction clutch including a flywheel, a pressure plate, a clutch disc provided on its outer peripheral portion with friction facings interposed between the flywheel and the pressure plate, and a main drive shaft supporting the clutch disc movably only in its axial direction, an apparatus comprising:

a holder fixedly supported on the main drive shaft,
spring means retained in the holder to move the clutch disc to its neutral position when the clutch is disengaged,
an adjusting member supported by the holder and governed by the holder with respect to the amount of its axial movement, and
a dished spring member interposed between a free end of the spring means and an end face of spline hub of the clutch disc, the dished spring member having a conical outer slanting face in engagement with the free end of the spring means and a conical inner slanting face in engagement with the end face of the spline hub, the dished spring member further including a plurality of hornlike extensions extending from its slanting portion and having distal ends in elastic engagement with the inner face of the adjusting member.

2. The apparatus as set forth in claim 1 wherein a plurality of shims are disposed between the inner bottom face of the holder and the spring means.

3. The apparatus as set forth in claim 1 wherein the holder bears against and is supported by an end face of inner ring of a pilot bearing rotatably supporting an end of the main drive shaft on the flywheel.

4. The apparatus as set forth in claim 1 wherein the spring means comprises in combination a plurality of dished springs with their conical slanting faces oritented in opposite directions alternately.

* * * * *